Patented Apr. 18, 1944

2,346,826

UNITED STATES PATENT OFFICE 2,346,826

BIS-(2,4-DIALKYLPHENOL)-4-ALKYL PHENOL SULPHIDES AND SALTS THEREOF

Elmer W. Cook, New York, N. Y., and William D. Thomas, Jr., Stamford, Conn., assignors to American Cyanamid Company, New York, N. Y., a corporation of Maine No Drawing. Application May 16, 1942, Serial No. 443,306

10 Claims. (Cl. 260—609)

This invention relates to new organic compounds and their preparation; more particularly to bis(2,4-dialkylphenol)-4-alkyl phenol sulphides and salts thereof.

The new compounds of the present invention to be described and claimed herein by us may be represented by the general formula

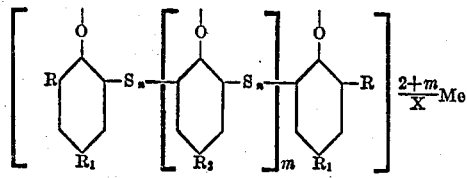

in which R, $R_1$ and $R_2$ are alkyl radicals, $n$ is the small whole number 1 or 2 and $m$ is the small whole number 1 or 2, Me is hydrogen or a salt-forming radical and X is the valence of Me.

We have found that these bis-(2,4-dialkylphenol)-4-alkyl phenol sulphides and salts thereof are good corrosion inhibitors, particularly when dissolved in lubricating oils and may be employed to good advantage therein in the preparation of heavy duty crankcase oils. In addition to being excellent corrosion inhibitors the compounds of the present invention when dissolved in lubricating oils exhibit detergent and dispersing properties and reduce the formation of sludge, ring sticking, varnish decomposition and other undesirable conditions which develop when the lubricating oil is subjected to heavy duty service. These compounds are also useful as dispersing agents, fungicides, in the preparation of fly sprays, corrosion-resistant slushing oils, as plasticizers for synthetic resins and rubber and other similar uses.

The compounds of the present invention may be prepared by reacting mixtures of 2,4-dialkyl phenols and 4-alkyl phenols with sulphur dichloride ($SCl_2$) or sulphur monochloride ($S_2Cl_2$) depending upon the type of sulphide desired as the reaction product. The salts of these compounds may be prepared from the resulting reaction product as will hereinafter be described.

When reacting two molecular proportions of 2,4-dialkyl phenol with one mole of 4-alkyl phenol and sulphur dichloride, for example, the reaction is as follows:

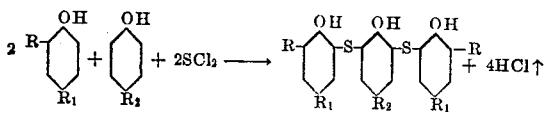

When using 2 moles of 2,4-dialkyl phenol mixed with 2 moles of 4-alkyl phenol with sulphur dichloride the reaction proceeds in the same way but with the formation of compounds having four aryl groups as follows:

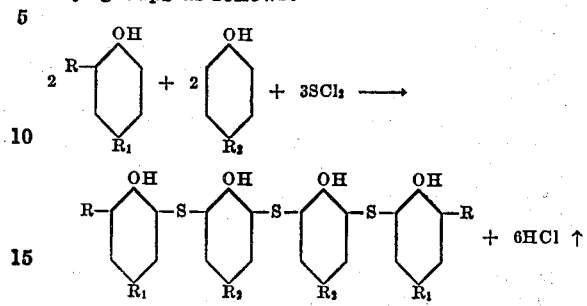

If an excess of 4-alkyl phenol is employed the resulting product may have 5 or more aryl groups connected with sulphur linkages. Because of their high molecular weight these compounds tend to be resinous in character.

When sulphur monochloride is substituted in place of the sulphur dichloride the aryl groups are bound together with two sulphur atoms, —S—S—, and $n$ in the general formula above becomes 2. These compounds possess similar properties to those in which a single sulphur atom links the different aryl groups.

In preparing our new compounds it is convenient to dissolve the various reactants in an inert solvent such as carbon disulphide, carbon tetrachloride, petroleum naphtha, ethylene dichloride, chlorbenzene, chloroform or the like. Merely mixing together the various reactants in the desired molecular proportions will cause the reaction to be brought about. No catalyst is ordinarily necessary. The reaction vessel should be fitted with agitating means and means for removing the HCl liberated. Towards the end of the reaction when the evolution of HCl has slowed considerably the preparation may be completed by heating the reaction mass to 50–60° C. for a few minutes to expel most of the remaining HCl. The product may then be washed with a dilute alkaline solution to remove traces of the acid. In the event that the material tends to emulsify during the washing step the addition of a small amount of butanol will help prevent emulsification. After washing the excess solvent may be removed from the product by evaporation under reduced pressure.

Salts of these compounds may be prepared by simple neutralization of the product with appropriate amounts of a desired salt-forming base such as NaOH, KOH, Ba(OH)$_2$, Ca(OH)$_2$, BaS, etc. or by double decomposition of the sodium salt with a desired metal salt such as, for example, SnCl$_2$, ZnCl$_2$, AlCl$_3$, etc. Metal salts of these compounds may also be prepared by reacting the compounds just described with appropriate molecular amounts of finely powdered metallic aluminum, metallic magnesium turnings, calcium metal, etc. A small amount of mercury chloride may be added to start the reaction. The reaction mixture may be gently heated on a steam bath at first but may require cooling later because of the exothermic character of the reaction. Metal salts may also be prepared by heating the compounds described with an alcoholate of a lower boiling alcohol, sodium methylate or aluminum butylate for example, under conditions such that the lower alcohol is driven off.

The preparation of representative compounds of the present invention will now be described in detail in the following examples. It should be understood, however, that these examples are given merely for purposes of illustration and our invention is not to be limited to the particular compounds or particular procedure employed since other bis-(2,4-dialkyl phenol)-4-alkyl phenol sulphides and their salts may be prepared by modifications thereof without departing from the scope of the invention set forth in the appended claims.

Example 1

164 parts by weight of p-tertiary amyl phenol and 468 parts by weight of 2,4-di-p-tertiary amyl phenol were dissolved in 260 parts by weight of benzol. 206 parts by weight of sulphur dichloride was then added to the solution with stirring, the temperature being maintained below 40° C. As soon as all the sulphur dichloride has been added the mixture was warmed to 50–60° C. for 10 minutes to complete the reaction and expel most of the HCl. The reaction mixture was then washed with warm dilute sodium carbonate solution to remove dissolved hydrogen chloride. The washed reaction product was then heated under reduced pressure to remove the benzol. Bis-(2,4-diamyl phenol)-4-amyl phenol dithio ether was obtained as a brown viscous product.

The barium salt of this product was obtained by dissolving 60 parts by weight thereof in 80 parts by weight of aromatic petroleum naphtha and 40 parts by weight of 95% alcohol. 41 parts by weight of finely ground Ba(OH)$_2$.8H$_2$O was added and the mixture heated and solvents and water boiled off. More naphtha was added from time to time to replace that lost by evaporation. When the temperature had reached 125–135° C. the neutralization was substantially complete and all of the water had been expelled. The solution was then diluted with naphtha and after cooling filtered from traces of inorganic barium salts. The solvent was then removed by evaporation under reduced pressure. The product was a stiff, viscous dark-colored liquid.

Example 2

234 parts by weight of 2,4-diamyl phenol and 164 parts by weight of mono-4-amyl phenol were dissolved in 260 parts by weight of aromatic petroleum naphtha and 155 parts by weight of sulphur dichloride added gradually with stirring, meanwhile keeping the temperature below 40° C. by cooling. After all the sulphur dichloride had been added the solution was warmed to 50–60° C. for 10 minutes to complete the reaction and expel most of the hydrogen chloride. The reaction mass was then washed with dilute sodium carbonate solution. The solvent was then removed by evaporation under reduced pressure. The product, bis-(2,4-diamyl phenol)-di-4-amyl phenol trithio ether was obtained as a brown viscous liquid, easily soluble in 10–W lubricating oil.

The barium salt of this product was obtained by treating 70 parts by weight thereof dissolved in 100 parts by weight of aromatic petroleum naphtha, (toluol fraction) and 50 parts by weight of 95% alcohol with 50 parts by weight of Ba(OH)$_2$.8H$_2$O with heating and removal of solvent as described in the preceding example.

As will be apparent we may use other 2,4-dialkyl phenols with other 4-alkyl phenols in the preparation of our new compounds. The various alkyl groups R, R$_1$ and R$_2$ in the general formula may be all the same or may be all different. In this way it is possible to control the viscosity and oil solubility of the resulting compound. For best oil solubility the compounds should have at least one, preferably more, alkyl groups of from 4–14 carbon atoms. Of the various 2,4-dialkyl phenols which may be employed by us may be mentioned 2,4-diamyl phenol, 4-tertiary butyl orthocresol, 2-dodecyl-4-tertiary amyl phenol, 2,4-di-tertiary butyl phenol, 2-butyl-4-isopropyl phenol, 2-butyl-4-amyl phenol, 2-isopropyl-4-octyl phenol, etc. As 4-alkyl phenols we may use those such as p-cresol, 4-isobutyl phenol, 4-tertiary amyl phenol, 4-ethyl hexyl phenol, 4-octyl phenol, 4-dodecyl phenol, and the like.

As will appear from what has been said before the relative amounts of the 2,4-dialkyl phenol and 4-alkyl phenol in the reaction mixture can vary considerably depending upon the type of product desired. Ordinarily two molecular proportions of the 2,4-dialkyl phenol with one or two moles of the 4-alkyl phenol is preferred. The amount of sulphur chloride or sulphur dichloride will depend upon the proportion of the 2,4-dialkyl phenol to the 4-alkyl phenol present in the reaction mixture and should be sufficient to combine with their reactive positions. The actual amount may be easily calculated from the reaction equations.

What we claim is:

1. Chemical compounds having the general formula

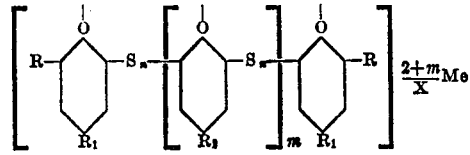

in which R, R$_1$ and R$_2$ are alkyl radicals, $n$ is a small whole number less than 3, $m$ is a small whole number less than 3, Me is a member of the group consisting of hydrogen and basic salt-forming radicals, and X is the valence of Me.

2. Chemical compounds having the general formula

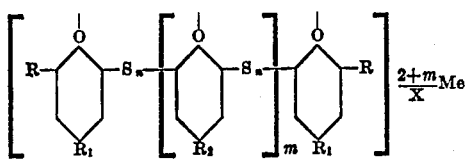

in which R, R$_1$ and R$_2$ are alkyl radicals, at least one of which has from 4 to 14 carbon atoms, $n$ is a small whole number less than 3, $m$ is a small whole number less than 3, Me is a member of the group consisting of hydrogen and basic salt-forming radicals, and X is the valence of Me.

3. Chemical compounds having the general formula

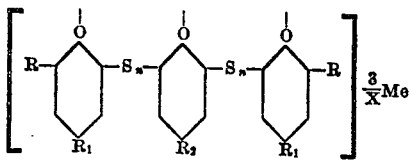

in which R, R₁ and R₂ are alkyl radicals, $n$ is a small whole number less than 3, Me is a member of the group consisting of hydrogen and basic salt-forming radicals, and X is the valence of Me.

4. Chemical compounds having the general formula

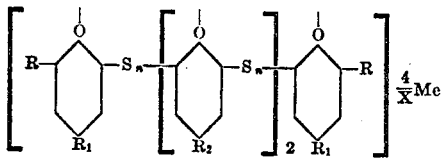

in which R, R₁ and R₂ are alkyl radicals, $n$ is a small whole number less than 3, Me is a member of the group consisting of hydrogen and basic salt-forming radicals, and X is the valence of Me.

5. Chemical compounds having the general formula.

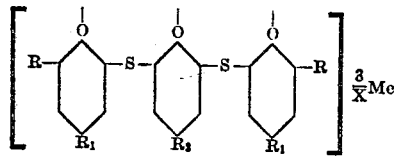

in which R, R₁ and R₂ are alkyl radicals, Me is a member of the group consisting of hydrogen and basic salt-forming radicals, and X is the valence of Me.

6. Chemical compounds having the general formula

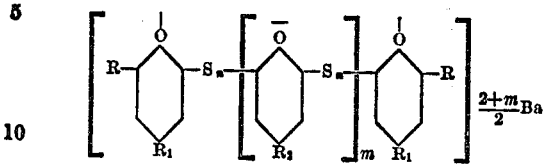

in which R, R₁ and R₂ are alkyl radicals, $n$ is a small whole number less than 3, and $m$ is a small whole number less than 3.

7. A method of preparing bis-(2,4-dialkyl phenol)-4-alkyl phenol sulphides which comprises reacting a 2,4-dialkyl phenol with a 4-alkyl phenol in the presence of a member of the group consisting of sulphur chloride and sulphur dichloride.

8. A method of preparing bis-(2,4-dialkyl phenol)-di-4-alkyl phenol sulphides which comprises reacting substantially equimolecular proportions of a 2,4-dialkyl phenol with a 4-alkyl phenol and a member of the group consisting of sulphur chloride and sulphur dichloride.

9. A method of preparing bis-(2,4-dialkyl phenol)-mono-4-alkyl phenol sulphides which comprises reacting substantially equimolecular proportions of a 2,4-dialkyl phenol with a 4-alkyl phenol and a member of the group consisting of sulphur chloride and sulphur dichloride.

10. A method of preparing bis-(2,4-diamyl phenol)-4-amyl phenol sulphides which comprises reacting 2,4-diamyl phenol with 4-amyl phenol in the presence of a member of the group consisting of sulphur chloride and sulphur dichloride.

ELMER W. COOK.
WILLIAM D. THOMAS, Jr.